United States Patent
Chan et al.

(10) Patent No.: US 8,365,177 B2
(45) Date of Patent: Jan. 29, 2013

(54) DYNAMICALLY MONITORING AND REBALANCING RESOURCE ALLOCATION OF MONITORED PROCESSES BASED ON EXECUTION RATES OF MEASURING PROCESSES AT MULTIPLE PRIORITY LEVELS

(75) Inventors: Wilson Chan, San Mateo, CA (US);
Angelo Pruscino, Los Altos, CA (US);
Ahmed S. Abbas, Tracy, CA (US); Tak Fung Wang, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1046 days.

(21) Appl. No.: 12/356,382

(22) Filed: Jan. 20, 2009

(65) Prior Publication Data

US 2010/0186016 A1    Jul. 22, 2010

(51) Int. Cl.
*G06F 9/50* (2006.01)
(52) U.S. Cl. .......... 718/103; 718/104; 712/220
(58) Field of Classification Search ............... None
See application file for complete search history.

(56) References Cited

U.S. PATENT DOCUMENTS

| | | | |
|---|---|---|---|
| 6,049,798 A * | 4/2000 | Bishop et al. | 1/1 |
| 6,542,950 B1 * | 4/2003 | Bodnar | 710/260 |
| 6,795,797 B2 * | 9/2004 | Lee et al. | 718/103 |
| 7,010,669 B2 * | 3/2006 | Burns et al. | 712/205 |
| 7,401,207 B2 * | 7/2008 | Kalla et al. | 712/215 |
| 2007/0300230 A1 * | 12/2007 | Barsness et al. | 718/103 |
| 2010/0031006 A1 * | 2/2010 | El-essawy et al. | 712/206 |

* cited by examiner

*Primary Examiner* — David Huisman
(74) *Attorney, Agent, or Firm* — Hickman Palermo Truong Becker Bingham Wong LLP

(57) ABSTRACT

Measuring processes are started at a plurality of priority levels. A different one of the measuring processes is started for each of the priority levels. Subsequently, for each of the measuring processes, it is determined whether each measuring process is scheduled for executing at a respective target rate. In response to determining that a particular measuring process of the measuring processes is not scheduled for executing at a particular target rate, resource allocation to at least one monitored process running at a particular level of the priority levels is adjusted. The at least one monitored process is not any of the measuring processes.

17 Claims, 4 Drawing Sheets

--- initiate a different measuring process, in a plurality of measuring processes, at each of a plurality of priority levels  310 determine whether one or more measuring processes at one or more priority levels are scheduled for executing at a normal rate  320 in response to determining that one or more measuring processes at one or more priority levels are not scheduled for executing at a normal rate, adjust resource allocation to at least one monitored process in a plurality of monitored processes  330 initiate a different measuring process, in a plurality of measuring processes, at each of a plurality of priority levels 310 determine whether one or more measuring processes at one or more priority levels are scheduled for executing at a normal rate 320 in response to determining that one or more measuring processes at one or more priority levels are not scheduled for executing at a normal rate, adjust resource allocation to at least one monitored process in a plurality of monitored processes 330

FIG. 3

DYNAMICALLY MONITORING AND REBALANCING RESOURCE ALLOCATION OF MONITORED PROCESSES BASED ON EXECUTION RATES OF MEASURING PROCESSES AT MULTIPLE PRIORITY LEVELS

FIELD OF THE INVENTION

The present invention relates to improving performance of computer systems, and in particular, to dynamically monitoring and rebalancing priority levels of processes in computer systems.

BACKGROUND OF THE INVENTION

Typically, many processes concurrently run on a computer system. These processes may have different priority levels. A priority level refers to an attribute associated by a process scheduling mechanism to determine how often and for how long a process is scheduled for CPU time relative to other processes. Generally, processes with higher priority are scheduled more often and/or for more CPU time than processes with lower priority.

At any given time, a subset of these processes may be ready to execute. Once placed in an executing state, a process often tries to execute as much as possible, in order to finish its work in as little time as possible. The process may monopolize CPU time for an extended period at other processes' expenses.

Unfortunately, when one or more processes monopolize CPU time, the overall performance of the computer system is actually reduced. For example, if the computer system on which a runaway process resides is a node in a multi-node system, then the node may not be able to timely respond to and coordinate with other nodes in the multi-node system, causing the node to be evicted of the multi-node system.

Sometimes, when a low-priority process holds a latch required by a high-priority process, an intermediate priority process may monopolize CPU time forcing the high-priority process to wait for the release of the latch by the low-priority process. Since the low-priority process also cannot proceed (e.g., to release the latch) due to lack of CPU time (which is being taken by the intermediate priority process), the intermediate priority process may continue to monopolize CPU time.

Under some techniques, a low-priority process that holds a latch that is being waited for by a higher-priority process is temporarily elevated to a priority level of the higher-priority process. However, if the process that monopolizes CPU time is of a priority level that is equal to or higher than the elevated priority level, then the low-priority process still may not timely release the latch.

The effects of this type of problems can be wide-ranging, as other processes and other computers may very well depend on the processes that have been directly impacted. For example, other processes and other systems such as application servers, web servers, or client applications may depend on the low-priority process and the higher-priority process described above.

As clearly shown, techniques are needed to dynamically monitor and rebalance priority levels of processes in computer systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is an example processing flow for dynamically monitoring and rebalancing priority levels according to an embodiment of the present invention.

DETAILED DESCRIPTION OF THE INVENTION

Techniques for dynamically monitoring and rebalancing priority levels of processes on a computer system are described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Example Multi-Node System

Figure 1:
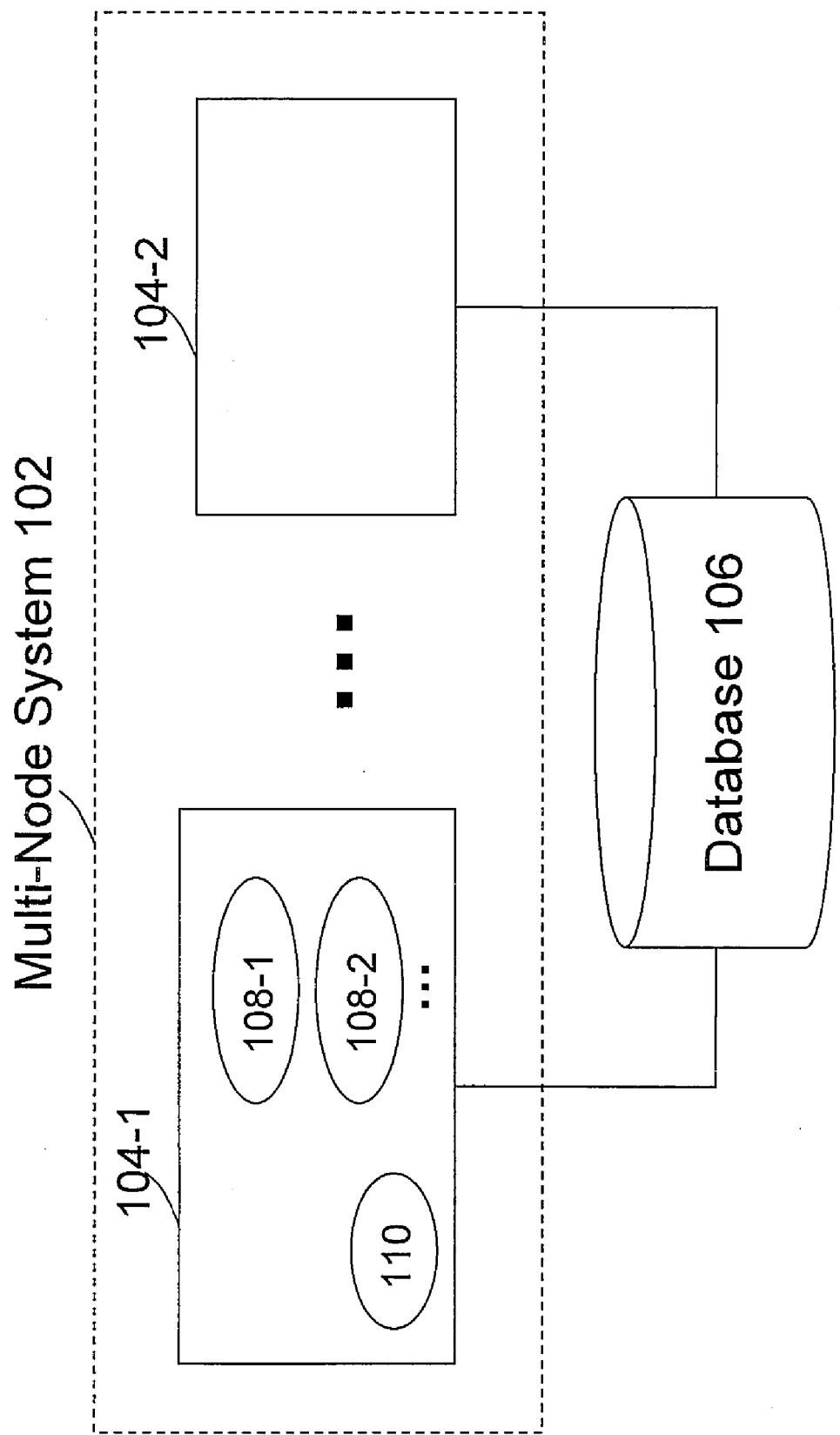
FIG. 1 illustrates an example system that comprises an example multi-node system according to an embodiment of the present invention.

According to an embodiment of the present invention, as illustrated in FIG. 1, the techniques may be performed by a multi-node system 102, which comprises multiple interconnected nodes (e.g., 104-1 and 104-2). The system 102 may provide user applications access to a database 106. The nodes (104) in the multi-node system 102 may be in the form of computers (e.g. work stations, personal computers) interconnected via a network. Alternatively, the nodes (104) may be nodes of a grid, where each node is interconnected on a rack. The grid may host multiple multi-node systems. Each node 104 may be a separate physical computer, or a separate domain (which, for example, may run inside a virtual machine) among a plurality of domains that partition a physical computer. In embodiments where some of the nodes 104 may be domains, each domain behaves independently like a separate physical computer and constitutes a separate logical computer.

Each node 104 may host a number of processes. For the purpose of illustration, node 104-1 may be a database instance that runs a number of database processes 108 as well as native OS processes 110. The database processes include, but are not limited to, a cluster synchronization service (CSS) process for synchronization with other database instances in the cluster, a recovery manager (RMAN) process for backup and recovery, a lock manager service (LMS) process for coordination of access to a buffer cache (which stores copies of data blocks retrieved from data files in the database 106), and database writer (DBW) processes for writing data from buffer cache to data files in the database 106.

For the purpose of illustration, as shown in FIG. 1, node 104-1 hosts a non-database process 110 and database processes 108-1 and 108-2 (among possibly many other database and non-database processes). Because these processes share a limited number of processors and a limited amount of other physical and logical resources (such as latches on data blocks) on the node 104-1, these processes sometimes are placed in an executing state and other times placed in a non-executing state. As used herein, the term "a process in an executing state" means that the one or more processors on the node 104-1 are currently executing the process or that the process is using CPU time. The term "a process in a non-executing state" means that the one or more processors on the node 104-1 are currently not executing the process or that the process is not using CPU time. Non-executing states include, but are not limited to, a ready-to-execute state, in which a process is ready to be placed in an executing state, for example, after the process has secured all the latches it needs.

Example Process Scheduling Mechanism

In some embodiments, the node 104-1 implements a process scheduling mechanism (e.g., 208 of FIG. 2) to determine whether a process (108 or 110) should be placed in an executing state. In some embodiments, this process scheduling mechanism implements one or more priority-based process scheduling algorithms. In these embodiments, a process assigned with a higher priority has a better chance to be scheduled into an executing state than another process with a lower priority. In some embodiments, the node 104-1 implements a number of priority levels at which a process may run. The priority (or priority level) of an individual process may be configured and changed programmatically or manually when the process starts up or while the process is running.

In some embodiments, some, or all, of the processes running on the node 104-1 are candidate processes for dynamic monitoring and rebalancing of priority levels. As used herein, the term "a process runs on a node" means broadly that the process has started and has not terminated on the node; the process may or may not be presently in an executing state. The term "dynamic monitoring" refers to monitoring the number of times being scheduled into an executing state for ready-to-execute processes at various priority levels during a unit time period at runtime. The term "dynamic rebalancing" refers to any, some, or all, of adjusting priority levels for one or more processes, increasing or decreasing allocated CPU time for individual processes and/or individual priority levels, and taking other actions that influence the scheduling of processes into an executing state at runtime.

Figure 2:
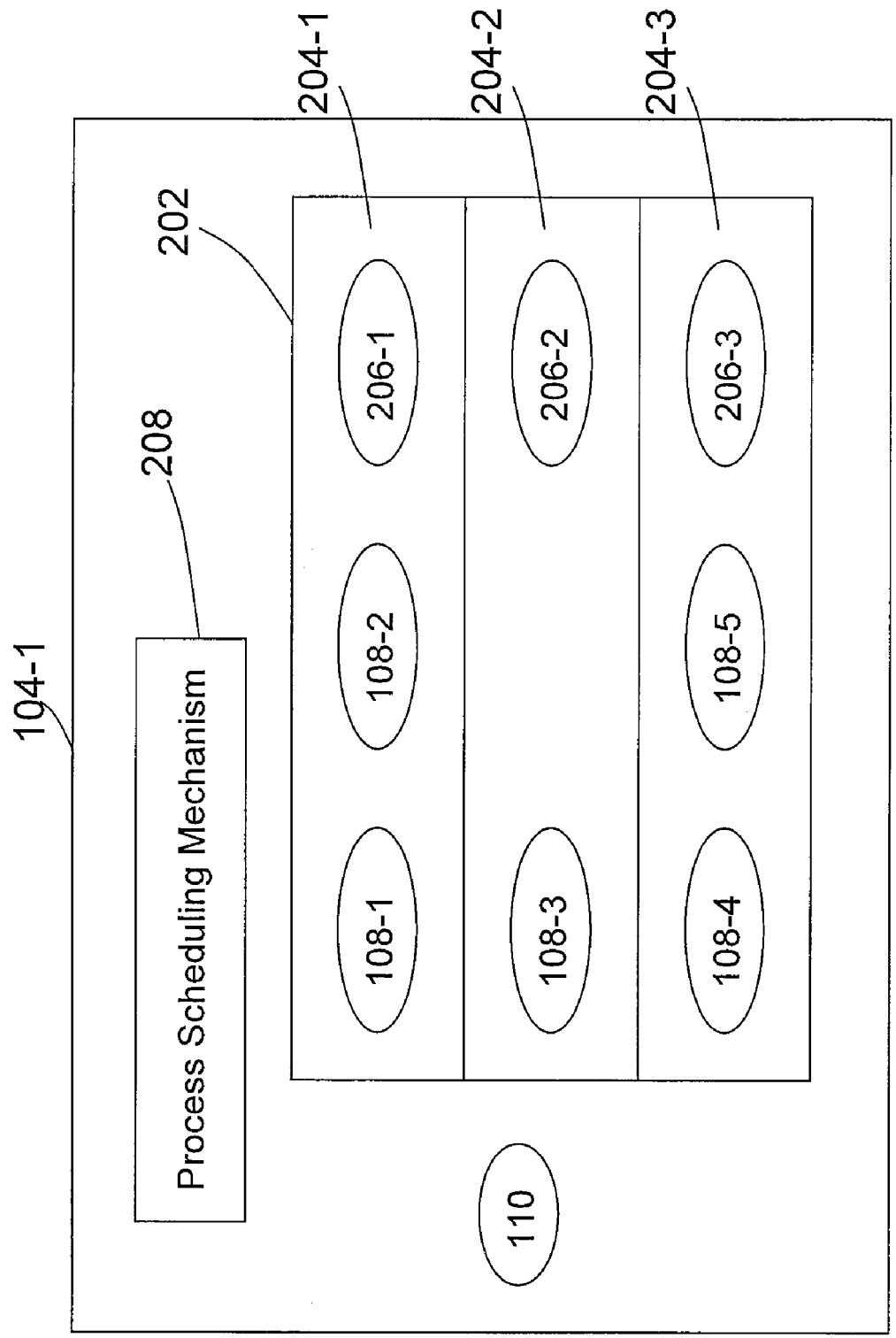
FIG. 2 illustrates an example node that comprises monitored processes according to an embodiment of the present invention.

In some embodiments, the candidate processes for dynamic monitoring and rebalancing (i.e., monitored processes) form a monitored process group (e.g., 202 of FIG. 2). In an embodiment, the database processes 108 are placed in the monitored process group. In another embodiment, the non-database processes 110 are placed in the monitored process group. In yet another embodiment, a combination of database processes 108 and non-database processes 110 may be placed in the monitored process group.

Example Monitored Process Group

FIG. 2 illustrates an example embodiment in which a monitored process group 202 as mentioned above comprises a number of database processes (108-1 through 108-5) running on the node 104. These database processes may be at various priority levels at any given runtime. For example, as shown in FIG. 2, processes 108-1 and 108-2 may presently be at a priority level 204-1. Process 108-3 may presently be at a priority level 204-2. Processes 108-4 and 108-5 may presently be at a priority level 204-3. For the purpose of explanation only, a process such as 108-1 in the monitored process group 202 may be referred to as "a monitored process."

A process scheduling mechanism 208 schedules a process (108 or 110) in and out of an executing state. In some embodiments, this process scheduling mechanism 208 works in conjunction with the operating system (e.g., UNIX) running on the node 104-1.

The process scheduling mechanism 208 determines whether and when a particular process should be placed in an executing state when the particular process is one of multiple processes ready for executing, based on the respective priority levels of the multiple processes. A priority level may be changed by the process-scheduling mechanism 208 at runtime. There are various forms of priority levels; an embodiment is not limited to any particular form. Examples of these forms may be, but not limited to, an operating system (i.e., OS) priority assigned to a process, a process class (e.g., whether the process is a kernel, a system, or a user process), an I/O access type (e.g., what type of I/O access the process makes), a combination of process attributes including the ones just mentioned, etc. For example, processes at the priority level 204-1 may be assigned a certain high OS priority. Processes at the priority level 204-2 may be assigned a certain normal OS priority but without database I/O access. Processes at the priority level 204-3 may be assigned the same normal OS priority with database I/O access.

Example Inter-Level Scheduling

The process scheduling mechanism 208 may treat different priority levels 204 differently based on a first process-scheduling algorithm. For example, the process scheduling mechanism 208 may use a strict priority based algorithm to determine which process is to be executed when two processes at two different priority levels are both ready to be executed. Alternatively and/or optionally, the process scheduling mechanism 208 may use a fairness-based algorithm that gives a process of a higher priority level relatively large probability to be scheduled into an executing state but does not absolutely exclude a process of a lower priority level from being executed when there is a higher priority level process is ready to be executed. In some embodiments, the process scheduling mechanism 208 may elevate or downgrade a process's priority level temporarily or permanently. For example, when a high-priority process at the priority level 204-1 requests a DB writer process (108-4 or 108-5) at the priority level 204-3 to perform a database I/O operation, the process scheduling mechanism 208 may temporarily elevate the DB writer process to the (high) priority level 204-1.

Example Intra-Level Scheduling

The process scheduling mechanism 208 may treat two processes at the same priority level equally based on a second process-scheduling algorithm when both processes are ready to execute. For example, the process scheduling mechanism 208 may employ an algorithm that uses a first-in-first-out queue to schedule processes at the same priority level 204. If a process is in a ready-to-execute state before another process of the same priority level 204, the process scheduling mechanism 208 may place the former in the executing state before the latter.

Alternatively, instead of an algorithm that uses the first-in-first-out queue, the process scheduling mechanism 208 may maintain timing information for previous executions of all processes at a particular priority level 204 and use an algorithm that makes use of the timing information. For example, the process scheduling mechanism 208 may first execute a process that is least recently executed. In other words, the more recently executed a process is, the less likely the process is to be executed before others.

Additionally and/or alternatively, the process scheduling mechanism 208 may maintain time slice information for how long each process has consumed CPU time and employ an algorithm that makes use of the time slice information. The process scheduling mechanism 208 may perform some fairness scheduling by first scheduling a process that has consumed relatively low CPU time in the past before scheduling other processes that have consumed relatively high CPU time.

Thus, these and other process scheduling algorithms may be used to schedule processes on the node 104-1.

Given these process-scheduling algorithms, starved processes and run-away processes may still exist without dynamic monitoring and rebalancing of priority levels of processes. As used herein, the term "a starved process" refers to a process that, over a certain time period, is placed and left in an executing state for an amount of time insufficient for the process to adequately perform its function. For example, the CSS process may need to respond to other nodes within a certain well-defined time period, say 5 seconds. If the CSS process cannot do so because the process is not placed in an executing state sufficiently frequently for sufficiently long intervals during the 5 second time period, then the CSS process becomes a starved process. As a consequence, the node 104-1 may be evicted from the multi-node system 102 by other nodes 104.

As used herein, the term "a runaway process" refers to a process that is placed in an executing state so frequently and for so long, relative to other processes, that the process causes one or more other processes to be starved processes. For example, a high-priority process that comprises a busy-wait loop may pre-empt other processes from being scheduled into an executing state.

In some approaches, software code for monitored processes 108 may be instrumented for the purpose of detecting a process scheduling problem at runtime. The term "code is instrumented" means that the code is embedded with logic that gathers information related to the scheduling of a corresponding monitored process into the executing state. A system administrator or a software program may analyze the information (e.g., stored in a trace, log, or statistics file) gathered by the instrumented code and make ad hoc adjustments to the priority level assignments of the monitored processes.

In contrast to these approaches, under new techniques described herein, it is not necessary to instrument software code to monitor the scheduling of these processes into an executing state.

Detecting Anomalies/Pathologies in Process Scheduling

Under new techniques described herein, for each of multiple priority levels monitored processes 108 in the monitored process group 202 may run, a measuring process runs. For example, as illustrated in FIG. 2, a measuring process 206 may be started for each of the priority levels 204-1 through 204-3. Thus, the process scheduling mechanism 208 treats the scheduling of a measuring process in the same way as the process scheduling mechanism 208 treats monitored processes at the same priority level.

A measuring process 206 implements logic which, when executed, measures how many times the measuring process 206 is scheduled into an executing state during a unit period of time at runtime. Instead of performing a busy-wait, the measuring process 206 may be programmed to sleep for most of the time during the unit period of time. When the measuring process 206 is asleep, it is not in a ready-to-execute state. Therefore, the process scheduling mechanism 208 does not attempt to schedule the measuring process 206 into an executing state when the measuring process 206 is asleep. This measure minimizes the amount of CPU time used by the measuring process 206.

The measuring process 206 may further be programmed to wake up for a fixed number of times during the unit time period at runtime. For example, the measuring process 206 may comprise logic to wake up from sleep every two seconds. Thus, if the unit period of time for measurement is one minute, the measuring process 206 is scheduled to wake up 30 times. Each time when the measuring process 206 wakes up, the process 206 may or may not be immediately scheduled into an executing state by the process scheduling mechanism 208. If scheduled into the executing state, the measuring process 206 is programmed to update a counter that keeps a count of how many times the measuring process 206 has waken up from the beginning of the unit period of time. The process 206 may additionally and/or optionally keep other information such as a history of actual wall clock times at which the process 206 wakes up or an average time the process 206 takes to wake up each time.

For example, if the measuring process 206 wakes up 30 times during each minute, then the information gathered by the process 206 may indicate that the process 206 has woken up for 30 times and that the average time the process 206 takes to wake up is two seconds. Thus, a reasonable inference can be made that monitored processes 108 at the same priority level as that of the corresponding measuring process 206 are being scheduled at a normal rate.

On the other hand, if the measuring process 206 wakes up fewer than 30 times during each minute, then it may be inferred that the monitored process 108 are not being scheduled at a normal rate.

Adjust Resource Allocation

In some embodiments, a monitor controller may be deployed on the node 104-1. In some embodiments, this monitor controller may be light-weight logic implemented within one of the measuring processes 206. In some embodiments, the monitor controller may be implemented within the process scheduling mechanism 208. In some embodiments, the monitor controller may be implemented as a stand-alone entity that may be of the highest priority level among all processes on the node 104.

For the purpose of illustration, a measuring process 206, which may be of the highest priority level among all the measuring processes 206, may comprise a thread that implements the monitor controller, while the measuring process 206 comprises another thread that implements the measuring process logic as described above.

In some embodiments, the monitor controller collects process scheduling information from measuring processes 206 at various priority levels. Based on the collected process scheduling information, the monitor controller may be programmed to determine whether any anomalies/pathologies in process scheduling exist on the node 104-1.

For example, out of the three priority levels illustrated in FIG. 2, two measuring processes 206 at two priority levels 204 may indicate that they are not awaken at a normal rate, while one measuring process 206 at the other priority level 204 indicates that it is awaken at a normal rate. Thus, the monitoring controller may determine that a runaway process may exist at the other priority level and that one or more processes at the two affected priority levels may be starved. The monitoring controller may be programmed to determine what type of adjustment needs to be made. For example, if the normal rate occurs at the priority level 204-2, the monitoring controller may determine that latches may not be freed timely at the priority level 204-3, thereby causing processes at the priority levels 204-1 and 204-3 from being scheduled into an executing state. The monitor controller may be programmed to provide more computing resources such as CPU time to the affected priority levels 204. For example, one or more processes at the priority level 204-2 may be temporarily re-assigned with lower (i.e., downgraded to) OS priorities. Likewise, one or more processes at the priority level 204-3 may be temporarily re-assigned with (i.e., elevated to) higher OS priorities.

Example Process

FIG. 3 illustrates an example process under the new techniques. In block 310, the process scheduling mechanism 208 initiates a different measuring process (e.g., 206-2), in a plurality of measuring processes (e.g., 206-1 through 206-3), at each (e.g., 204-2) of a plurality of priority levels (e.g., 204-1 through 204-3).

In some embodiments, a measuring process 206 at a particular priority level 204 is a special-purpose process that is seeded with other processes (which may be, but are not limited to, monitoring processes 108) at that particular priority level 204, taking measurements whether the measuring process 206 are scheduled into an executing state at a normal rate. As used herein, the normal rate refers to a rate at which the measuring process 206 is designated to be scheduled into an executing state. For example, if the measuring process 206 is designated to wake up 30 times per minute, then the measuring process 206 is scheduled at a normal rate if the process wakes up 30 times per minute. Each measuring process may have the same normal rate or alternatively its own normal rate. For example, while one measuring process is designated to wake up 30 times per minute, another measuring process may be designated to wake up 30 times per second. Variations of normal rates at which measuring processes should be scheduled into an executing state are within the scope of the invention.

In block 320, the process scheduling mechanism 208 (e.g., through the monitor controller that may or may not be implemented as a separate process on the node 104-1) determines whether one or more measuring processes (e.g., 206-1 and 206-3) at one or more priority levels (e.g., 204-1 and 204-3) are scheduled for executing at a normal rate. In some embodiments, the process scheduling mechanism 208 determines whether each of a plurality of measuring processes (e.g., 206-1, 206-2 and 206-3) at each corresponding priority level (e.g., 204-1, 204-2 and 204-3, respectively) in a plurality of priority levels (e.g., 204-1, 204-2 and 204-3) is scheduled for executing at a normal rate. Here, the plurality of measuring processes 206 includes the one or more measuring processes 206, and the plurality of priority levels 204 includes the one or more priority levels 204. In some embodiments, at least one (e.g., 206-3) of the one or more measuring processes 206 at one or more priority levels 204 is scheduled to wake up periodically.

In block 330, the process scheduling mechanism 208 adjusts resource allocation to at least one monitored process (e.g., 108-4) in a plurality of monitored processes (e.g., 108-1 through 108-5), in response to determining that one or more measuring processes 206 at one or more priority levels 204 are not scheduled for executing at a normal rate. In some embodiments, to adjust resource allocation to at least one monitored process (e.g., 108-4) in a plurality of monitored processes 108 may assign a new priority level (204-1 instead of the original 204-3) to said at least one monitored process (i.e., 108-4 in the present example) in a plurality of monitored processes 108. In some embodiments where the process scheduling mechanism 208 can control time slice allocation to priority levels 204, to adjust resource allocation to at least one monitored process in a plurality of monitored processes 108, the process scheduling mechanism 208 may allocate a new amount of CPU time to all processes (108 and 206) at a priority level 204. In some embodiments, to adjust resource allocation to at least one monitored process (e.g., 108-4) in a plurality of monitored processes 108 may swap operating system (OS) priorities between two priority levels 204, thereby causing all processes at one of the two priority levels 204 to be assigned with the other of the two priority levels 204.

The plurality of monitored processes may include database processes, non-database processes, or a combination of database processes and non-database processes. In some embodiments, at least one of the monitored processes is a time-sensitive process which is required to complete certain tasks such as responding to another node's inquiry within a strict time limit. In some embodiments, the plurality of monitored processes 108 and the plurality of measuring processes 206 form a monitored process group 202.

In some embodiments, the process scheduling mechanism 208 may continuously monitor and adjust resource allocation to individual processes, a set of processes, individual priority levels, or a set of priority levels based on system conditions.

It has been described that a monitored process may be adjusted to consume less or more CPU time when anomalies/pathologies in process scheduling is detected. However, the present invention is not so limited. In some embodiments, instead of adjusting processes for consumption of CPU time, the node 104 may allocate less or more computing resources of other types to one or more processes. For example, a monitored process may be allowed to use more or less memory for its operation so that the monitored process can perform its work slower or faster than otherwise.

It has been described that a measuring process is started in each of the priority levels on a node 104. However, the present invention is not so limited. In some embodiments, instead of using dedicated processes as measuring processes, one or more monitored processes may implement the same logic of the measuring processes as previously described. In some other embodiments, a combination of dedicated measuring processes and non-dedicated measuring processes may also be used.

Hardware Overview

Figure 4:
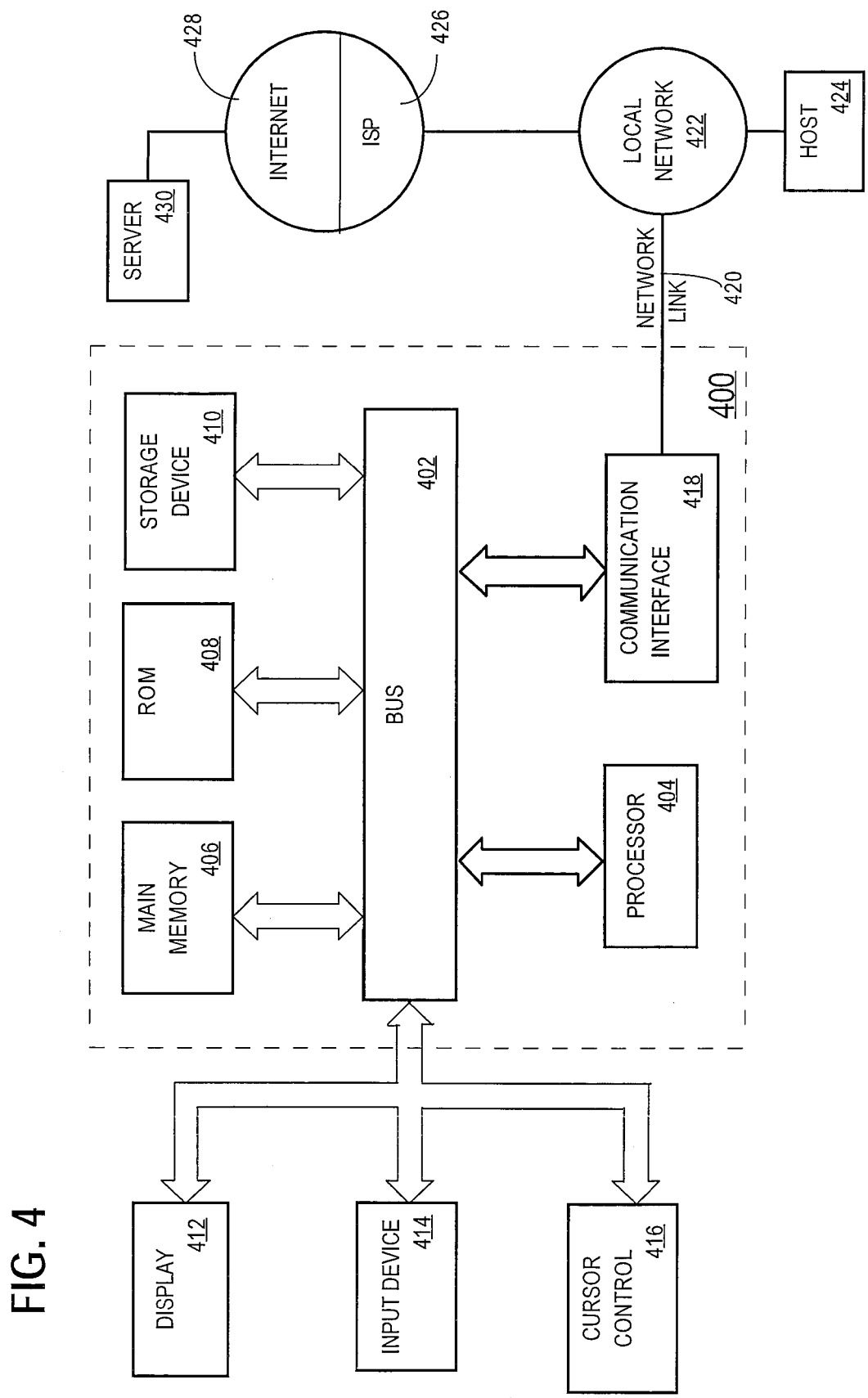
FIG. 4 is a block diagram of a computer system that may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to an embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media and volatile media. Non-volatile media includes, for example, optical or magnetic disks, such as storage device 410. Volatile media includes dynamic memory, such as main memory 406.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
    starting a plurality of measuring processes at a plurality of priority levels;
    wherein a different measuring process of said plurality of measuring processes is started for each priority level of said plurality of priority levels;
    in response to said starting a plurality of measuring processes at a plurality of priority levels:
        for each measuring process of said plurality of measuring processes, determining whether said each measuring process is scheduled for executing at a respective target rate;
        in response to determining that a particular measuring process of said plurality of measuring processes is not scheduled for executing at a particular target rate, adjusting resource allocation to at least one monitored process running at a particular level of said plurality of priority levels, wherein said at least one monitored process is not any of said plurality of measuring processes;
    wherein a computer system performs each step of the method.

2. A method as recited in claim 1, wherein adjusting resource allocation to said at least one monitored process in a plurality of monitored processes includes assigning a new priority level to said at least one monitored process in said plurality of monitored processes.

3. A method as recited in claim 1, wherein adjusting resource allocation to said at least one monitored process in a plurality of monitored processes includes allocating a new amount of central processing unit (CPU) time to all processes at a priority level.

4. A method as recited in claim 1, wherein adjusting resource allocation to said at least one monitored process in a plurality of monitored processes includes swapping operating system (OS) priorities between two priority levels.

5. A method as recited in claim 1, wherein at least one of the one or more measuring processes at the plurality of priority levels is scheduled to wake up periodically.

6. A method as recited in claim 1, wherein said at least one monitored process includes database processes.

7. A method as recited in claim 1, wherein said at least one monitored process includes non-database processes.

8. A method as recited in claim 1, wherein said at least one monitored process includes at least one process that is time-sensitive.

9. A non-transitory computer-readable storage medium storing one or more sequences of instructions which, when executed by one or more processors, causes the one or more processors to perform:
   starting a plurality of measuring processes at a plurality of priority levels;
   wherein a different measuring process of said plurality of measuring processes is started for each priority level of said plurality of priority levels;
   in response to said starting a plurality of measuring processes at a plurality of priority levels:
      for each measuring process of said plurality of measuring processes, determining whether said each measuring process is scheduled for executing at a respective target rate;
      in response to determining that a particular measuring process of said plurality of measuring processes is not scheduled for executing at a particular target rate, adjusting resource allocation to at least one monitored process running at a particular level of said plurality of priority levels, wherein said at least one monitored process is not any of said plurality of measuring processes.

10. A medium as recited in claim 9, wherein adjusting resource allocation to said at least one monitored process in a plurality of monitored processes includes assigning a new priority level to said at least one monitored process in said plurality of monitored processes.

11. A medium as recited in claim 9, wherein adjusting resource allocation to said at least one monitored process in a plurality of monitored processes includes allocating a new amount of central processing unit (CPU) time to all processes at a priority level.

12. A medium as recited in claim 9, wherein adjusting resource allocation to said at least one monitored process in a plurality of monitored processes includes swapping operating system (OS) priorities between two priority levels.

13. A medium as recited in claim 9, wherein at least one of the one or more measuring processes at the plurality of priority levels is scheduled to wake up periodically.

14. A medium as recited in claim 9, wherein said at least one monitored process includes database processes.

15. A medium as recited in claim 9, wherein said at least one monitored process includes non-database processes.

16. A medium as recited in claim 9, wherein said at least one monitored process includes at least one process that is time-sensitive.

17. An apparatus comprising:
   one or more processors; and
   one or more sequences of instructions which, when executed by the one or more processors, cause the one or more processors to perform:
      starting a plurality of measuring processes at a plurality of priority levels;
      wherein a different measuring process of said plurality of measuring processes is started for each priority level of said plurality of priority levels;
      in response to said starting a plurality of measuring processes at a plurality of priority levels:
         for each measuring process of said plurality of measuring processes, determining whether said each measuring process is scheduled for executing at a respective target rate;
         in response to determining that a particular measuring process of said plurality of measuring processes is not scheduled for executing at a particular target rate, adjusting resource allocation to at least one monitored process running at a particular level of said plurality of priority levels, wherein said at least one monitored process is not any of said plurality of measuring processes.

* * * * *

UNITED STATES PATENT AND TRADEMARK OFFICE
CERTIFICATE OF CORRECTION

PATENT NO. : 8,365,177 B2  
APPLICATION NO. : 12/356382  
DATED : January 29, 2013  
INVENTOR(S) : Chan et al.

It is certified that error appears in the above-identified patent and that said Letters Patent is hereby corrected as shown below:

In the Specifications:

In column 6, line 19, after "up" delete "for".

Signed and Sealed this  
Seventh Day of May, 2013

Teresa Stanek Rea  
*Acting Director of the United States Patent and Trademark Office*